(12) United States Patent
Fujisawa et al.

(10) Patent No.: US 10,493,673 B2
(45) Date of Patent: Dec. 3, 2019

(54) METHOD FOR MOLDING FOAMED RESIN MOLDED ARTICLE, MOLD, AND FOAMED RESIN MOLDED ARTICLE

(71) Applicant: TOYODA GOSEI CO., LTD., Kiyosu-shi, Aichi-ken (JP)

(72) Inventors: Hitoshi Fujisawa, Kiyosu (JP); Yu Hishida, Kiyosu (JP); Kunio Yamazaki, Kiyosu (JP); Yasuaki Nakamura, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 228 days.

(21) Appl. No.: 15/459,252

(22) Filed: Mar. 15, 2017

(65) Prior Publication Data

US 2017/0305046 A1 Oct. 26, 2017

(30) Foreign Application Priority Data

Apr. 26, 2016 (JP) ................................ 2016-088039

(51) Int. Cl.
*B29C 44/42* (2006.01)
*B29C 44/02* (2006.01)
(Continued)

(52) U.S. Cl.
CPC .............. *B29C 44/02* (2013.01); *B29C 44/42* (2013.01); *B29C 44/58* (2013.01); *B32B 5/32* (2013.01);
(Continued)

(58) Field of Classification Search
None
See application file for complete search history.

(56) References Cited

U.S. PATENT DOCUMENTS 6,309,586 B1* 10/2001 Colley .................... B29C 43/18
264/259
2007/0187859 A1* 8/2007 Kaneko .................. B29C 44/08
264/51

FOREIGN PATENT DOCUMENTS

JP 59-138421 A 8/1984
JP 2006-175708 A 7/2006
JP 2007-130966 A 5/2007

OTHER PUBLICATIONS

First Office Action dated Dec. 4, 2017 issued in corresponding German patent application No. 10 2017 108 449.5 (and English translation attached).
(Continued)

*Primary Examiner* — Monica A Huson
*Assistant Examiner* — Kelsey C Grace
(74) *Attorney, Agent, or Firm* — POSZ Law Group, PLC

(57) ABSTRACT

Provided are a method for molding a foamed resin molded article having a mounting hole which is formed with good dimensional precision without occurrence of shape sag and which has an improved load resistance, a mold therefor, and a foamed resin molded article thereby. A method for molding a foamed resin molded article 1 including a mounting section 11 and a non-mounting section 12, using a mold 3 including a first mold 31 having a non-mounting-section mold portion 31a and a mounting-section mold portion 31b, a second mold 32, and a cavity 4 having a non-mounting-section cavity portion 42 for molding the non-mounting section 12 and a mounting-section cavity portion 41 for molding the mounting section 11. The method includes: a filling step of filling a material to be molded into at least the mounting-section cavity portion 41; and a core-back step of moving at least one of the non-mounting-section mold portion 31a, the mounting-section mold portion 31b, and the second mold 32 so that a cavity width of the non-mounting-
(Continued)

section cavity portion 42 is increased while a cavity width of the mounting-section cavity portion 41 is constant, the filling step and the core-back step being sequentially performed.

4 Claims, 5 Drawing Sheets

(51) Int. Cl.
    *B29C 44/58*     (2006.01)
    *B32B 5/32*     (2006.01)
    *B29K 23/00*     (2006.01)
    *B29K 105/04*     (2006.01)
    *B29L 31/30*     (2006.01)

(52) U.S. Cl.
    CPC .... *B29K 2023/12* (2013.01); *B29K 2105/043* (2013.01); *B29L 2031/30* (2013.01); *B32B 2605/00* (2013.01)

(56) References Cited

OTHER PUBLICATIONS

Office Action dated Apr. 16, 2019 issued in corresponding JP patent application No. 2016-088039 (and English translation).

\* cited by examiner

METHOD FOR MOLDING FOAMED RESIN MOLDED ARTICLE, MOLD, AND FOAMED RESIN MOLDED ARTICLE

TECHNICAL FIELD

The present invention relates to a method for molding a foamed resin molded article, a mold, and a foamed resin molded article.

BACKGROUND ART

Among fixing members for vehicles are, for example, brackets for holding registers for air conditioners, clusters, and the like, and the brackets are disposed on the back side of the instrument panels of automobiles. In recent years, a molded article made of a foamed resin, i.e. a foamed resin molded article is used for such a bracket from the viewpoint of reduction of the weight. Foamed resin molded articles are typically molded by a material, to be molded, which contains a resin material, such as polypropylene, polyethylene, or the like, and a foaming agent, being injected and filled into a cavity of a mold having a movable mold portion, and the movable mold portion being thereafter moved back by core-back. The foamed resin molded article thus molded has a porous foamed layer in which foam is formed by the foaming agent. In other words, the foamed resin molded article has a relatively low density thereinside, and therefore, is lightweight as compared to solid resin molded articles having no foamed layers.

A foamed resin molded article such as a bracket for use in an automobile has a mounting hole for fixing the article itself to a counterpart member or for positioning the article itself, or the like. For example, a screw, a clip mounted on a clip seat, or the like, is inserted into the mounting hole.

It is known that, in a foamed resin molded article formed by core-back molding, so-called "shape sag" having a round portion may occur at edge sections thereof or an opening peripheral edge section of the mounting hole. When such shape sag occurs at the opening peripheral edge section of the mounting hole, the dimensional precision of the mounting hole decreases, and therefore, the opening peripheral edge section may not assuredly have a desired thickness. If the opening peripheral edge section does not have a sufficient thickness, a clip or the like may not be stably fixed. Also, since shape sag occurring at the opening peripheral edge section of the mounting hole causes decrease of the thickness, the opening peripheral edge section may not assuredly have a sufficient load resistance. In such a case, the foamed resin molded article is not sufficiently fixed to a counterpart member, and therefore, unusual sound is likely to occur due to the loose attachment.

Under these circumstances, a molding technique for inhibiting the occurrence of shape sag as described above is disclosed in, for example, Japanese Laid-Open Patent Publication No. 2007-130966 (hereinafter, referred to as Patent Literature 1). In the molding technique disclosed in Patent Literature 1, a protrusion for forming a mounting hole is provided in a movable mold portion, and a finely uneven portion is provided on the outer peripheral surface of the protrusion. During the core-back process, the movable mold portion is moved back while the finely uneven portion engages with and holds a material, to be molded, which is in contact with the outer peripheral surface of the protrusion. Therefore, the material to be molded is allowed to follow the mold surface of the movable mold portion during the core-back process. In other words, the opening peripheral edge section of the mounting hole is molded so as to have a shape along the mold surface of the movable mold portion. Thus, according to the molding technique disclosed in Patent Literature 1, the occurrence of shape sag is inhibited at the opening peripheral edge section of the mounting hole.

However, in the molding technique disclosed in Patent Literature 1, the foamed layer in which foam is formed by the foaming agent is also formed by core-back molding in the opening peripheral edge section of the mounting hole. As described above, the foamed layer is porous, that is, has a relatively low density, and therefore, has a low load resistance. Therefore, there is still a problem that the opening peripheral edge section of the mounting hole has a reduced load resistance.

SUMMARY OF INVENTION

Technical Problem

The present invention has been made in view of the above circumstances, and an object of the present invention is to provide a method for molding a foamed resin molded article having a mounting hole which is formed with good dimensional precision without occurrence of shape sag and which has an improved load resistance, a mold therefor, and a foamed resin molded article thereby.

Solution to Problem

In order to solve the aforementioned problem, a molding method of the present invention is directed to a method for molding a foamed resin molded article including a mounting section and a non-mounting section other than the mounting section, the mounting section including a mounting hole for mounting the article to a counterpart member and an opening peripheral edge section of the mounting hole. In the method, a mold is used, and the mold includes a first mold, a second mold, and a cavity, the first mold including a non-mounting-section mold portion having a non-mounting-section mold surface and a mounting-section mold portion adjacent to the non-mounting-section mold portion and having a mounting-section mold surface, the second mold having a second mold surface, and the cavity having a non-mounting-section cavity portion for molding the non-mounting section and a mounting-section cavity portion for molding the mounting section, the non-mounting-section cavity portion being formed between the non-mounting-section mold surface and the second mold surface, the mounting-section cavity portion being formed between the mounting-section mold surface and the second mold surface and being continuous with the non-mounting-section cavity portion, and the cavity having respective cavity widths of the non-mounting-section cavity portion and the mounting-section cavity portion. The method includes: a filling step of filling a resin material containing a foaming agent into at least the mounting-section cavity portion of the cavity; and a core-back step of moving at least one of the non-mounting-section mold portion, the mounting-section mold portion, and the second mold so that the cavity width of the non-mounting-section cavity portion is increased while the cavity width of the mounting-section cavity portion is constant, the filling step and the core-back step being performed sequentially. The non-mounting section includes a porous foamed layer and a non-mounting-section skin layer formed on a surface of the foamed layer, and the opening peripheral edge section of the mounting section includes a fine-foamed layer having a density higher than the foamed layer, and a mounting-section skin layer formed on a surface of the fine-foamed layer.

Further, a mold of the present invention is directed to a mold for molding, by core-back molding, a foamed resin molded article including a mounting section and a non-mounting section other than the mounting section, the mounting section including a mounting hole for mounting the article to a counterpart member and an opening peripheral edge section of the mounting hole. The mold includes: a first mold including a non-mounting-section mold portion having a non-mounting-section mold surface and a mounting-section mold portion having a mounting-section mold surface; and a second mold having a second mold surface. In the mold, a cavity formed between the first mold and the second mold has a non-mounting-section cavity portion for molding the non-mounting section and a mounting-section cavity portion for molding the mounting section, the non-mounting-section cavity portion being formed between the non-mounting-section mold surface and the second mold surface, the mounting-section cavity portion being formed between the mounting-section mold surface and the second mold surface, the cavity having respective cavity widths of the non-mounting-section cavity portion and the mounting-section cavity portion. The mounting-section mold portion of the first mold, or the second mold, includes a hole molding protrusion having a protrusion outer peripheral mold surface for molding the mounting hole. The mold has a first state in which the non-mounting-section mold surface is located closer to the second mold surface than the mounting-section mold surface is, and a step mold surface facing the protrusion outer peripheral mold surface, being continuous with the non-mounting-section mold surface, and intersecting the non-mounting-section mold surface and the mounting-section mold surface, defines the mounting-section cavity portion. The mold has a second state in which at least one of the non-mounting-section mold portion, the mounting-section mold portion, and the second mold is moved so that the cavity width of the non-mounting-section cavity portion is increased while the cavity width of the mounting-section cavity portion is constant. The mold is changed from the first state to the second state.

Further, a foamed resin molded article of the present invention includes: a mounting section including a mounting hole for mounting the article to a counterpart member and an opening peripheral edge section of the mounting hole; a non-mounting section which is other than the mounting section; and a skin layer provided at a surface of the article. The non-mounting section has a porous foamed layer and a portion of the skin layer formed on a surface of the foamed layer. The mounting section has a fine-foamed layer having a density higher than the foamed layer, and another portion of the skin layer formed on a surface of the fine-foamed layer. The article has a reinforcement section at a boundary between the mounting section and the non-mounting section, the reinforcement section being formed by the rest of the skin layer being folded over, the reinforcement section extending inward from the surface.

Advantageous Effects of Invention

According to the method, for molding a foamed resin molded article, of the present invention having the above features, the mold thereof, and the foamed resin molded article thereof, the mounting hole provided in the foamed resin molded article is formed with good dimensional precision, and the load resistance of the opening peripheral edge section of the mounting hole is improved.

DESCRIPTION OF EMBODIMENTS

Preferred embodiments of a method and mold, according to the present invention, for molding a foamed resin molded article having a mounting hole and a foamed resin molded article according to the present invention will be described below with reference to FIG. 1 to FIG. 9. Note that the foamed resin molded article of the present invention is molded by the molding method of the present invention using the mold of the present invention. However, the method and mold for molding a foamed resin molded article according to the present invention are not limited to those embodiments.

The accompanying drawings used for explanation are only schematic, and the shapes, relative positional relationships, size relationships, and the like of parts are not necessarily drawn to scale. Unless otherwise specified, the upper and lower limit values of numerical ranges described herein, as well as numerical values described in the embodiments, are optionally combined to provide new numerical ranges. A value optionally selected from these numerical ranges may be used as the numerical value of the upper or lower limit.

Matters required for carrying out the present invention other than matters specifically mentioned herein are understood to be design matters, for a person skilled in the art, based on conventional arts in the relevant field. The present invention is carried out on the basis of the contents disclosed herein and common technical knowledge in the relevant field.

(Embodiments)

Figure 9:
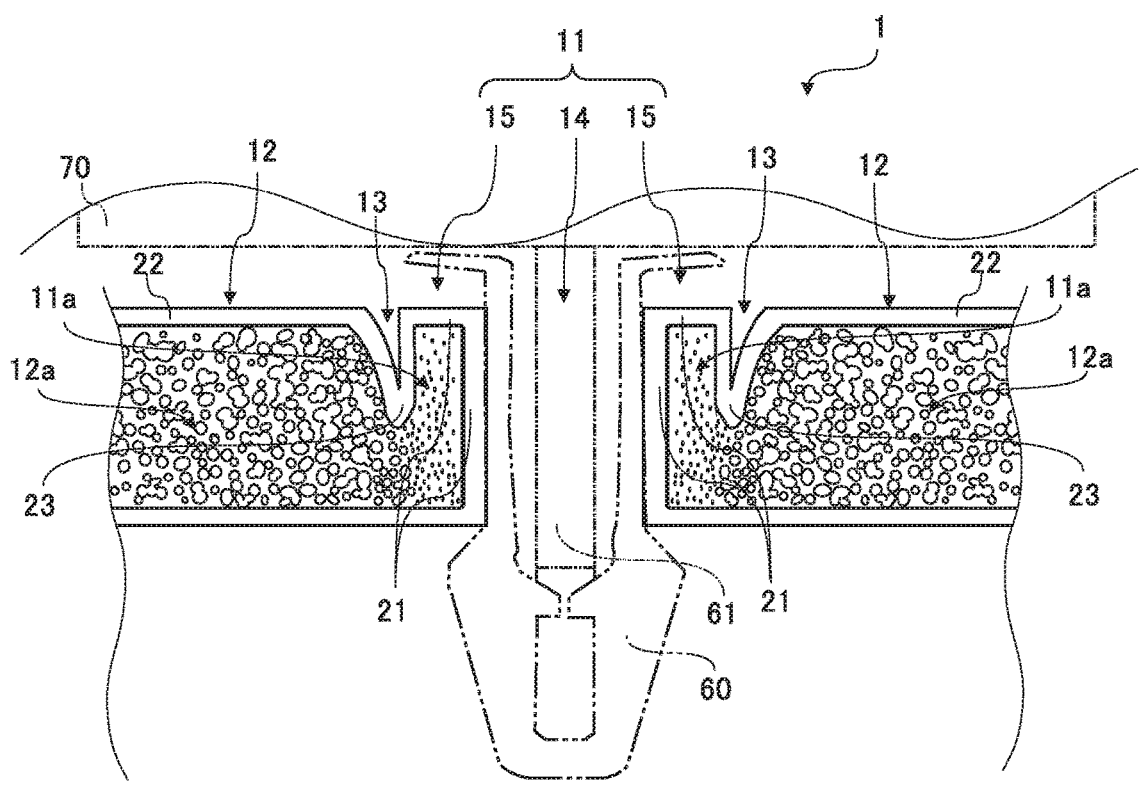
FIG. 9 illustrates a mounting section and a surrounding portion thereof of a foamed resin molded article according to an embodiment.

A molding method according to an embodiment is for molding a foamed resin molded article 1 by core-back molding. As shown in FIG. 9, the foamed resin molded article 1 formed by the molding method of the embodiment has a mounting section 11, and a non-mounting section 12 other than the mounting section 11. The mounting section 11 has a through-hole into and through which a protrusion provided in a counterpart member 70 is inserted. In the present embodiment, the mounting section 11 has a mounting hole 14, and an opening peripheral edge section 15 which is a peripheral edge of the mounting hole 14. A clip 60 mounted on a clip seat 61 which protrudes from the counterpart member 70 is fitted into the mounting hole 14.

The molding method, a mold 3, and the foamed resin molded article 1 of the present invention are characterized by the mounting section 11 which is provided in the foamed resin molded article 1 and which has the mounting hole 14 and the opening peripheral edge section 15. Therefore, the mounting section 11, and the non-mounting section 12 therearound in the foamed resin molded article 1, will be mainly described with reference to FIG. 1 to FIG. 9.

[Mold]

Figure 1:
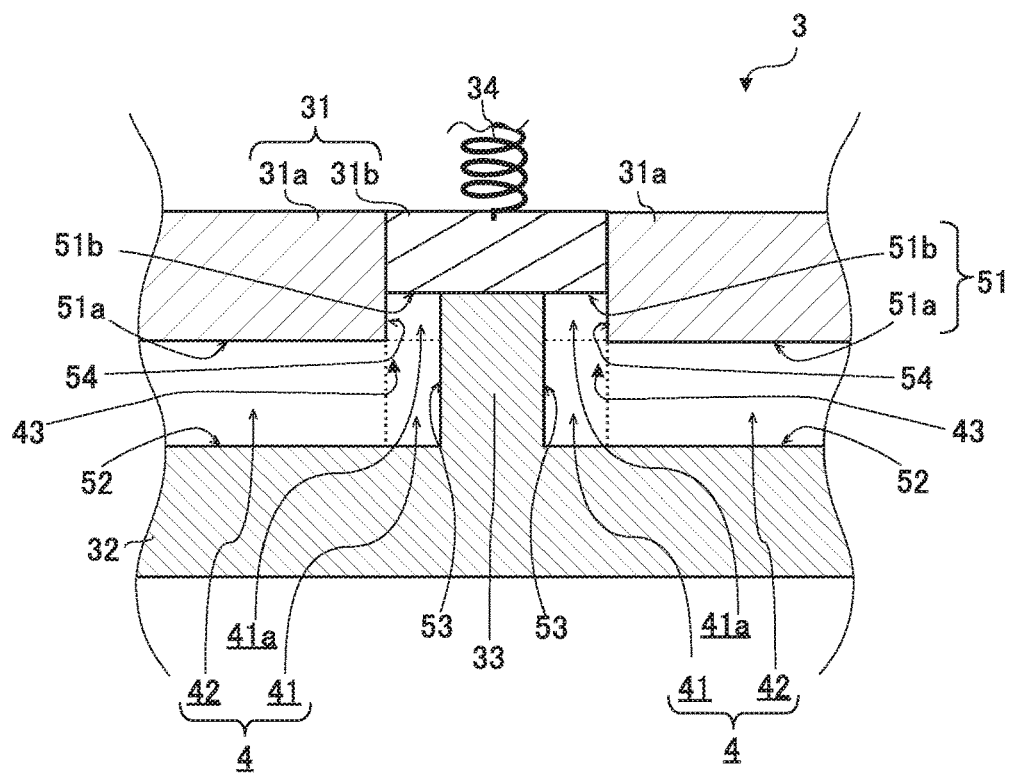
FIG. 1 illustrates a clamped state of a mold according to an embodiment.
Figure 2:
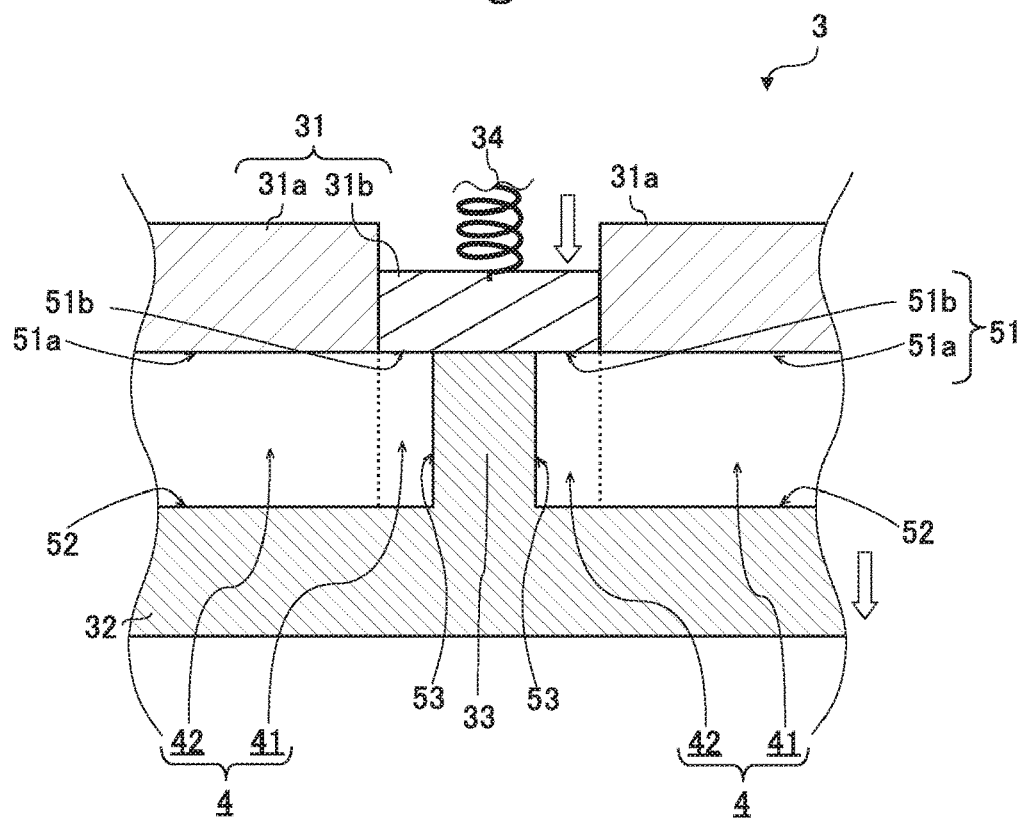
FIG. 2 illustrates a state of the mold after a core-back process according to the embodiment.

As shown in FIG. 1 and FIG. 2, the mold 3 of the present embodiment includes a first mold 31 which is shown on the upper side in the figures, and a second mold 32 which is shown on the lower side in the figures. The first mold 31 and the second mold 32 face each other. In the mold 3 of the present embodiment, the second mold 32 is a movable mold. A portion of the first mold 31 is movable integrally with the second mold 32, and the rest of the first mold 31 is fixed.

The first mold 31 includes a non-mounting-section mold portion 31a for molding the non-mounting section 12, and a mounting-section mold portion 31b for molding the mounting section 11. The mounting-section mold portion 31b is moved during a core-back process. The non-mounting-section mold portion 31a is located around and adjacent to the mounting-section mold portion 31b. As shown in FIG. 1 and FIG. 2, the mounting-section mold portion 31b is prompted toward the second mold 32 by a spring 34. As a result, the mounting-section mold portion 31b is in contact with a hole molding protrusion 33 (described below) of the second mold 32. During the core-back process, the mounting-section mold portion 31b and the second mold 32 are integrally moved.

The second mold 32 has the hole molding protrusion 33 for molding the mounting hole 14 of the mounting section 11. The hole molding protrusion 33 is in the shape of a cylinder which protrudes from the second mold 32 toward the first mold 31. The end of the hole molding protrusion 33 is in contact with the mounting-section mold portion 31b.

The second mold 32 is movable toward or away from the non-mounting-section mold portion 31a of the first mold 31 by means of an opening/closing device (not shown) including a high-speed hydraulic cylinder, for example. As a result, the mold 3 is clamped and opened, and in addition, the second mold 32, and the mounting-section mold portion 31b which is moved integrally with the second mold 32, are movable during the core-back process.

The temperature of the mold 3 is adjusted using a temperature adjustment device (not shown) including a cooling water circulation device, for example. As a result, even when a resin material at a high temperature is filled into a cavity 4 formed by the first mold 31 and the second mold 32, the mold 3 is maintained at a predetermined temperature.

The clamped mold 3 has the cavity 4 formed between a first mold surface 51 which is a mold surface of the first mold 31 and a second mold surface 52 which is a mold surface of the second mold 32. The cavity 4 includes a mounting-section cavity portion 41 for molding the mounting section 11 of the foamed resin molded article 1, and a non-mounting-section cavity portion 42 for molding the non-mounting section 12 other than the mounting section 11. The non-mounting-section cavity portion 42 is formed around the mounting-section cavity portion 41. The mounting-section cavity portion 41 and the non-mounting-section cavity portion 42 are in communication with each other.

The non-mounting-section cavity portion 42 is formed between a non-mounting-section mold surface 51a which is a mold surface of the non-mounting-section mold portion 31a of the first mold 31, and the second mold surface 52 facing the non-mounting-section mold surface 51a. The mounting-section cavity portion 41 is formed between a mounting-section mold surface 51b which is a mold surface of the mounting-section mold portion 31b of the first mold 31, and the second mold surface 52 facing the mounting-section mold surface 51b.

As described above, in the mold 3 of the present embodiment, the hole molding protrusion 33 is provided in the second mold 32. As shown in FIG. 1 and FIG. 2, a protrusion outer peripheral mold surface 53 which is an outer peripheral surface of the hole molding protrusion 33 defines the mounting-section cavity portion 41.

In the mold 3 of the present embodiment, the non-mounting-section mold surface 51a, of the non-mounting-section mold portion 31a, of the first mold surface 51, forms a surface of the non-mounting section 12, while the mounting-section mold surface 51b, of the mounting-section mold portion 31b, of the first mold surface 51, forms a surface of the opening peripheral edge section 15 of the mounting section 11. The protrusion outer peripheral mold surface 53 of the hole molding protrusion 33 forms an inner peripheral surface of the mounting hole 14 of the mounting section 11.

In the mold 3 of the present embodiment, during the core-back process, the second mold 32 is moved back away from the non-mounting-section mold portion 31a of the first mold 31 while the mounting-section mold portion 31b of the first mold 31 is moved integrally with the second mold 32. In other words, the non-mounting-section mold portion 31a of the first mold 31 is not moved. Therefore, in the cavity 4 after the core-back process, the volume of the non-mounting-section cavity portion 42 is increased because the second mold surface 52 has been moved away from the non-mounting-section mold surface 51a, while the volume of the mounting-section cavity portion 41 is not increased and is maintained in a state in the case of the mold 3 being clamped because the second mold surface 52 and the mounting-section mold surface 51b have been integrally moved.

FIG. 1 shows states of the mounting-section cavity portion 41 and the non-mounting-section cavity portion 42 around the mounting-section cavity portion 41 before the core-back process. As shown in FIG. 1, in the mold 3 before the core-back process, the non-mounting-section mold surface 51a of the first mold surface 51 is located closer to the second mold surface 52 than the mounting-section mold surface 51b is, and therefore, the non-mounting-section mold surface 51a and the mounting-section mold surface 51b are offset from each other in a core-back direction. Here, the core-back direction in the present embodiment means a direction in which the second mold 32 is away from the non-mounting-section mold portion 31a.

Therefore, at a boundary between the non-mounting-section mold portion 31a and the mounting-section mold portion 31b before the core-back process, the non-mounting-section mold surface 51a is not flush with the mounting-section mold surface 51b, and a step section 43 which is a portion of the non-mounting-section mold portion 31a is formed as shown in FIG. 1. In this case, in the mounting-section cavity portion 41 and the non-mounting-section cavity portion 42 around the mounting-section cavity portion 41, the cross-section perpendicular to the first mold surface 51 and the second mold surface 52 is L-shaped.

As shown in FIG. 1, the step section 43 formed in the non-mounting-section mold portion 31a before the core-back process is continuous with the non-mounting-section mold surface 51a, intersects the non-mounting-section mold surface 51a and the mounting-section mold surface 51b, and has a step mold surface 54 which faces a portion of the protrusion outer peripheral mold surface 53. In other words, in the mold 3 before the core-back process, the mounting-section cavity portion 41 is defined by the mounting-section mold surface 51b, the second mold surface 52, the protrusion outer peripheral mold surface 53, and the step mold surface 54. The state shown in FIG. 1 of the mold 3 before the core-back process is referred to as the "first state" of the mold 3.

FIG. 2 shows a state of the mold 3 after the core-back process. In the mold 3 of the present embodiment, during the core-back process, the second mold 32 is moved back in a direction indicated by an outline arrow shown in FIG. 2, and the mounting-section mold portion 31b of the first mold 31 is moved so as to follow the second mold 32. The non-mounting-section mold portion 31a of the first mold 31 is not moved.

As shown in FIG. 2, in the mold 3 of the present embodiment after the core-back process, the mounting-section mold portion 31b of the first mold 31 is moved until the mounting-section mold surface 51b is substantially flush with the non-mounting-section mold surface 51a. The state shown in FIG. 2 of the mold 3 after the core-back process is referred to as the "second state" of the mold 3. The mold 3 of the present embodiment is configured so as to be changeable between the first state and the second state.

Here, a width in the core-back direction between the first mold surface 51 and the second mold surface 52 is referred to as a "cavity width." A width in the core-back direction between the mounting-section mold surface 51b and the second mold surface 52 in the mounting-section cavity portion 41 is referred to as a "mounting-section cavity width," and a width in the core-back direction between the non-mounting-section mold surface 51a and the second mold surface 52 in the non-mounting-section cavity portion 42 is referred to as a "non-mounting-section cavity width."

As shown in FIG. 2, after the core-back process, the mounting-section cavity width and the non-mounting-section cavity width are substantially equal to each other. The mounting-section cavity width after the core-back process is a thickness of the mounting section 11 of the foamed resin molded article 1 to be molded. The non-mounting-section cavity width after the core-back process is a thickness of the non-mounting section 12 of the foamed resin molded article 1 to be molded. Therefore, the foamed resin molded article 1 which is molded using the mold 3 of the present embodiment has substantially a constant thickness over the mounting section 11 and the non-mounting section 12 around the mounting section 11. Note that the non-mounting-section cavity width after the core-back process is larger than the non-mounting-section cavity width before the core-back process. Meanwhile, the mounting-section cavity width is not changed before and after the core-back process.

In the mold 3 of the present embodiment, the non-mounting-section cavity width before the core-back process is 2.0 mm, and the mounting-section cavity width is 2.8 mm. In the core-back process, the non-mounting-section mold portion 31a is relatively moved back until the non-mounting-section mold surface 51a is substantially flush with the mounting-section mold surface 51b. In other words, a core-back movement width over which the non-mounting-section mold portion 31a is relatively moved back in the present embodiment is 0.8 mm. However, the non-mounting-section cavity width before the core-back process, the mounting-section cavity width, and the core-back movement width are not limited to the above values. The non-mounting-section cavity width before the core-back process and the mounting-section cavity width are preferably set such that the non-mounting-section cavity width before the core-back process is greater than or equal to 1.0 mm and not greater than 5.0 mm, the mounting-section cavity width is greater than or equal to 1.5 mm and not greater than 6.0 mm, and the core-back movement width is greater than or equal to 0.5 mm and not greater than 1.0 mm.

[Molding Method]

Next, the molding method of an embodiment will be described. In the molding method of the present embodiment, the above mold 3 is used. The molding method of the present embodiment includes a preparation step, a filling step, a core-back step, and a cooling step.

In the preparation step, a material 10, to be molded, containing a resin material and a foaming agent is placed in a foamed resin molding device (not shown), and is heated and softened to obtain the material 10, in a liquid state, to be molded. The material 10, to be molded, which is used in the molding method of the present embodiment contains 75 parts by mass of polypropylene, 5 parts by mass of sodium hydrogen carbonate, and 20 parts by mass of talc. Of these components, the sodium hydrogen carbonate serves as a foaming agent. Specifically, the sodium hydrogen carbonate is heated and decomposed into sodium carbonate, water, and carbon dioxide. Among those, the carbon dioxide may cause generation of foam in the resin material. The decomposition reaction rate is enhanced in the presence of water, and therefore, the generation of foam may continuously proceed in the resin material due to the above decomposition reaction. At this time, the foaming agent causes generation of small foam. This state is referred to as "fine foaming."

In the filling step, initially, the mold 3 is clamped. Specifically, as shown in FIG. 1, the mold 3 is clamped so that the non-mounting-section mold portion 31a of the first mold 31 is located closer to the second mold 32 than the mounting-section mold portion 31b is. Thus, in the filling step, the mounting-section cavity portion 41 for molding the mounting section 11 has substantially the same shape as that of the mounting section 11 obtained after molding. Meanwhile, the non-mounting-section cavity portion 42 for molding the non-mounting section 12 is slightly thinner than the non-mounting section 12 obtained after molding.

Next, an injection device (not shown) is used to inject and fill the material 10, to be molded, which has been obtained in the preparation step, into the cavity 4 of the clamped mold 3. Note that, at this time, the non-mounting-section mold portion 31a of the first mold 31 is clamped toward the second mold 32 by a force which is sufficient to maintain the size (the non-mounting-section cavity width before the core-back process) of the non-mounting-section cavity portion 42 against fluid pressure caused by the material 10 to be molded. In other words, at this time, the non-mounting-section mold portion 31a is clamped toward the second mold 32 by a force which is sufficient to maintain the non-mounting-section mold portion 31a at the position shown in FIG. 1 against fluid pressure caused by the material 10 to be molded. In the present embodiment, at this time, the internal pressure of the cavity 4 is 37 MPa, and the non-mounting-section mold portion 31a is clamped at 55 MPa. Note that, at this time, the material 10 to be molded has a relatively high temperature (e.g., about 200° C.), and the mold 3 is also heated (e.g., about 200° C.). Therefore, in the non-mounting-section cavity portion 42 and the mounting-section cavity portion 41, following the preparation step, the foaming agent contained in the material 10 to be molded causes gradual thermal decomposition to generate small foam, i.e. the foaming agent causes formation of fine foam.

The resin material included in the material 10 to be molded is polypropylene in the present embodiment, but is not limited to a specific kind of resin material. For example, instead of polypropylene, commonly used resins, such as polyethylene, polyvinyl chloride, and the like, may be employed.

The foaming agent included in the material 10 to be molded is sodium hydrogen carbonate, which is a chemical foaming agent, in the present embodiment, but is not limited to a specific kind of foaming agent. For example, instead of sodium hydrogen carbonate, inorganic foaming agents such as ammonium hydrogen carbonate, ammonium carbonate, and the like, nitroso compounds such as N,N'-dinitrosopentamethylenetetramine and the like, azo compounds such as azodicarbonamide, azobisisobutyronitrile, and the like, sulfonyl hydrazides such as benzenesulfonyl hydrazide, toluenesulfonyl hydrazide, diphenylsulfone-3,3'-disulfonyl hydrazide, and the like, p-toluenesulfonyl semicarbazide, and the like may be employed. Alternatively, instead of the above chemical foaming agents, physical foaming agents such as carbon dioxide, nitrogen, and the like may be employed. In the present embodiment, the foaming agent is previously added to the resin material, injected into the mold 3, which is melted by being heated. Instead thereof, the resin material which has been previously melted by being heated may be filled into the mold 3, and thereafter, the foaming agent may be directly added to the resin material having been melted by being heated.

The proportion of the foaming agent added to the resin material is preferably, but is not limited to, greater than or equal to 1.0 parts by weight and not greater than 10.0 parts by weight with respect to 100 parts by weight of the resin material, for example.

In the filling step of the present embodiment, after the material 10 to be molded is filled into the cavity 4 of the mold 3, the internal pressure of the cavity 4 is held for a predetermined time period while the mold 3 is being cooled. To hold the internal pressure in the filling step is for formation of a skin layer 2 having a sufficient thickness.

For holing the internal pressure of the cavity 4, the mold-clamped state is maintained and the injection pressure is held as it is, after the material 10 to be molded is injected and filled into the cavity 4. The surface of the material 10 to be molded is cooled by the mold surface of the mold 3 the temperature of which is adjusted to, for example, about 40° C. As a result, on the surface of the material 10, to be molded, which is filled into the cavity 4, the skin layer 2 which is solidified in a state where the foaming agent is finely foamed, is formed. At this time, in the material 10, to be molded, which is located inward of the skin layer 2, the resin material is not solidified, and the foaming agent is finely foamed.

In the pressure holding in the filling step, as the internal pressure other than those described above, the internal pressure of the cavity is preferably higher than or equal to 30 MPa and not higher than 60 MPa, and more preferably higher than or equal to 32 MPa and not higher than 50 MPa. The time period during which the pressure is held is preferably longer than or equal to 0.5 seconds and not longer than 60 seconds after the melted foamed resin is filled into the mold 3. When the held pressure and the pressure holding period fall within the above ranges, the skin layer 2 having a sufficient thickness is formed, and the mechanical stiffness of the surface of the foamed resin molded article 1 having been thus molded is improved.

Figure 3:
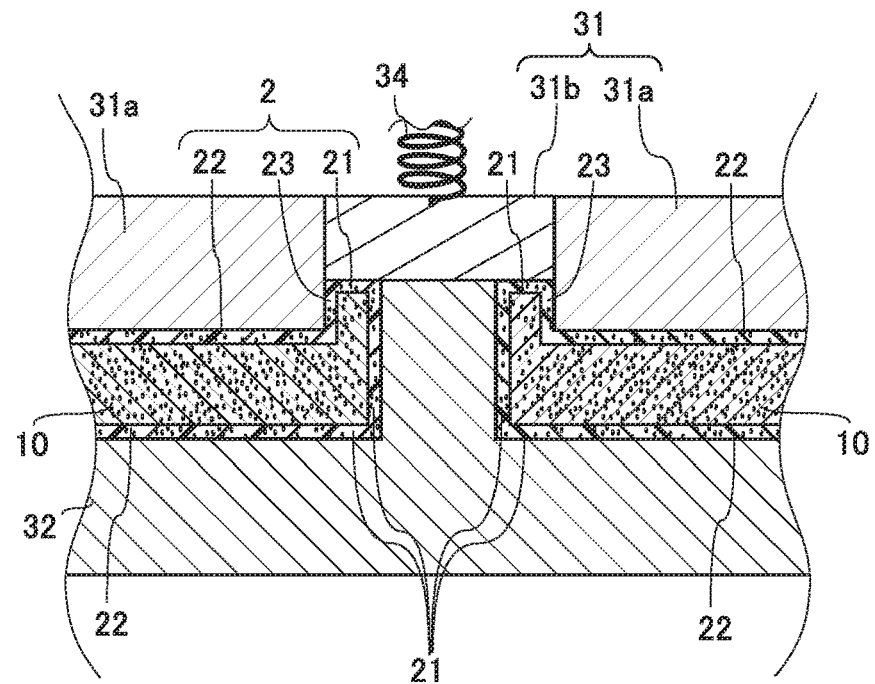
FIG. 3 illustrates a state of the inside of the mole in a filling step of a molding method according to the embodiment.

FIG. 3 shows a state of the material 10, to be molded, which has been filled into the cavity 4 in the filling step. As shown in FIG. 1 and FIG. 3, after the pressure is held in the filling step, on the surface of the material 10, to be molded, which is filled into the mounting-section cavity portion 41 and the non-mounting-section cavity portion 42, the skin layer 2 is formed so as to be correspond to the shapes of the first mold surface 51, the second mold surface 52, and the protrusion outer peripheral mold surface 53. More specifically, a non-mounting-section skin layer 22 is formed in the non-mounting-section cavity portion 42 so as to correspond to the shapes of the non-mounting-section mold surface 51a of the first mold surface 51 and the second mold surface 52 facing the non-mounting-section mold surface 51a. Amounting-section skin layer 21 is formed in the mounting-section cavity portion 41 so as to correspond to the shapes of the mounting-section mold surface 51b of the first mold surface 51, the second mold surface 52 facing the mounting-section mold surface 51b, and the protrusion outer peripheral mold surface 53. In addition, a step skin layer 23 is formed in the mounting-section cavity portion 41 so as to correspond to the shape of the step mold surface 54 of the non-mounting-section mold portion 31a facing the protrusion outer peripheral mold surface 53.

In the mounting-section cavity portion 41 in the filling step, a fine-foamed layer 11a described below may be molded in a portion inward of the mounting-section skin layer 21 and the step skin layer 23 and in the vicinity of the mounting-section skin layer 21 and the step skin layer 23. This is because, as described below, the mounting-section cavity portion 41 has a cavity protrusion section 41a which causes increase of a contact area between the mold surface and the material 10, to be molded, having been filled. Therefore, the material, to be molded, having been filled is more easily cooled in the mounting-section cavity portion 41 than in the non-mounting-section cavity portion 42. Therefore, in the mounting-section cavity portion 41, the fine-foamed layer 11a may be molded in a portion, of the material, which is in contact with the mounting-section skin layer 21 and the step skin layer 23.

Figure 4:
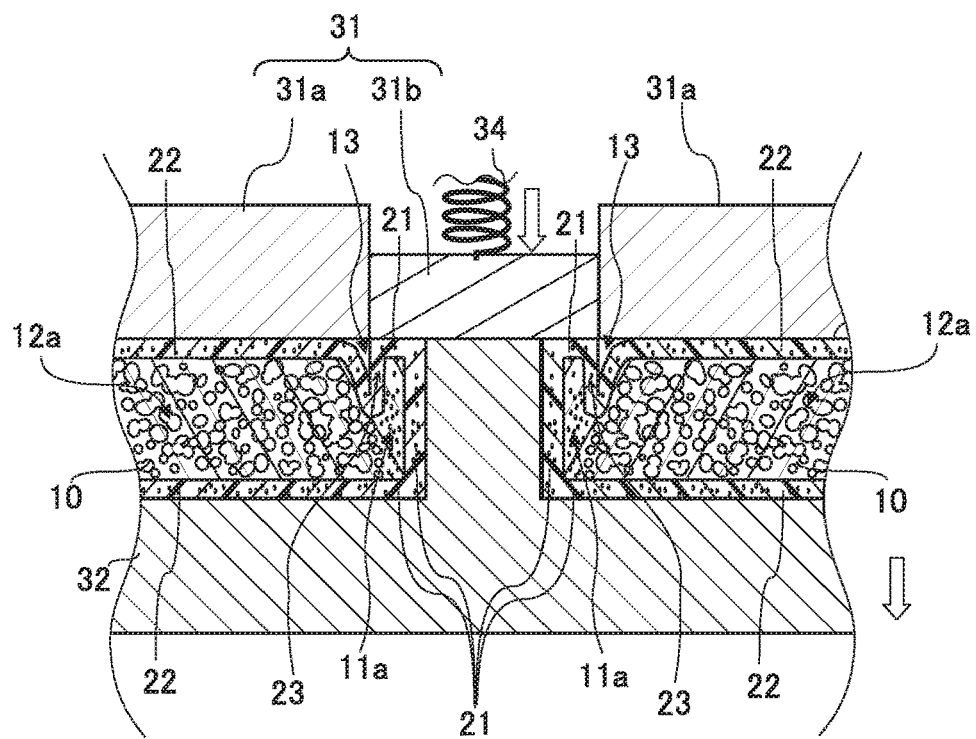
FIG. 4 illustrates a state of the inside of the mold in a core-back step of the molding method according to the embodiment.

FIG. 4 shows a state of the material 10, to be molded, which has been filled into the cavity 4, in the core-back step. As shown in FIG. 2 and FIG. 4, in the core-back step, the second mold 32 is moved back away from the non-mounting-section mold portion 31a so as to move the mounting-section mold portion 31b until the mounting-section mold surface 51b is flush with the non-mounting-section mold surface 51a. In the present embodiment, the core-back direction is substantially the same as the thickness direction of the non-mounting section 12 and the mounting section 11 which are to be molded.

In the core-back step, the volume of the non-mounting-section cavity portion 42 is increased in the core-back direction, and therefore, the foaming agent located inward of the non-mounting-section skin layer 22 causes foaming in the material 10, to be molded, in the non-mounting-section cavity portion 42. As a result, the material 10 to be molded is expanded as a whole.

In the core-back step of the present embodiment, the mounting-section cavity width is constant, while only the non-mounting-section cavity width is increased. In other words, the volume of the non-mounting-section cavity portion 42 is increased, while the volume of the mounting-section cavity portion 41 is maintained in a state in the case of the mold 3 being clamped. Therefore, in the non-mounting-section cavity portion 42 after the core-back operation, the increase of the volume causes reduction of pressure. As a result, the foaming agent causes foaming in a portion, inward of the non-mounting-section skin layer 22, of the material 10, to be molded, in the non-mounting-section cavity portion 42. Specifically, in the core-back step, in the non-mounting-section cavity portion 42, the non-mounting-section skin layer 22 for the surface is formed, and a foamed layer 12a having a lower density than the fine-foamed layer 11a is formed inward of the non-mounting-section skin layer 22.

Meanwhile, the volume of the mounting-section cavity portion 41 is not changed before and after the core-back process. Therefore, foaming by the foaming agent is reduced in a portion, inward of the mounting-section skin layer 21, of the material 10, to be molded, in the mounting-section cavity portion 41. Therefore, in the core-back step of the present embodiment, fine foaming is caused by the foaming agent in a portion, inward of the mounting-section skin layer 21, of the material 10, to be molded, in the mounting-section cavity portion 41. In other words, in the core-back step, the fine-foamed layer 11a having the mounting-section skin layer 21 on the surface thereof is formed in the mounting-section cavity portion 41.

Figure 5:
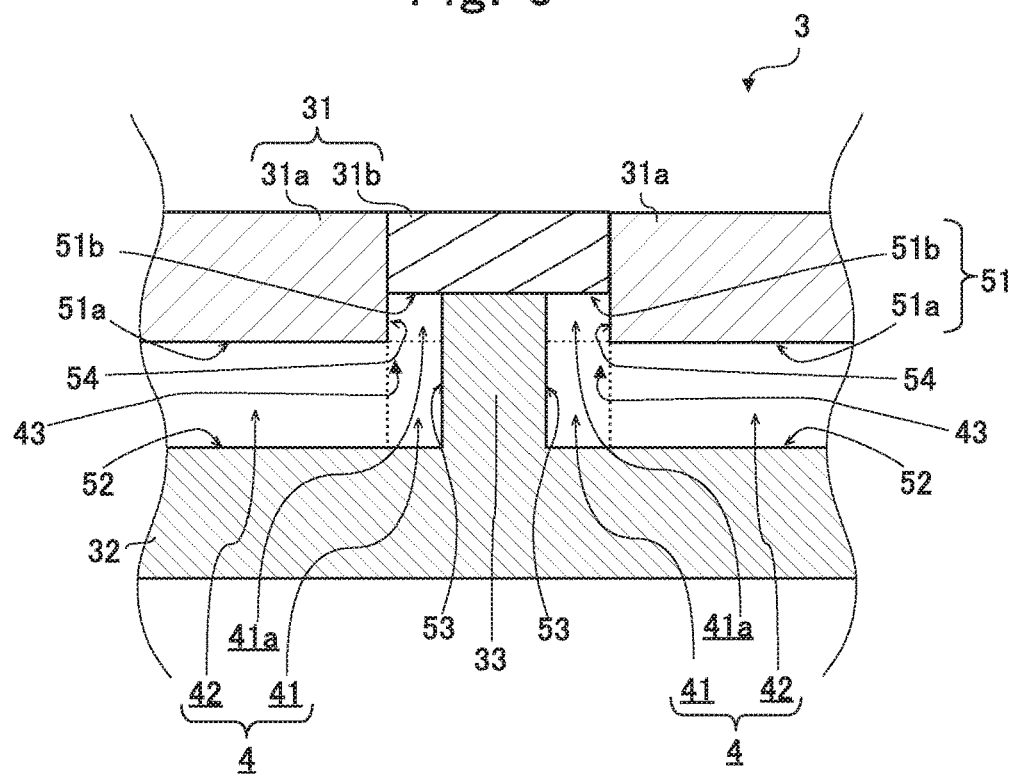
FIG. 5 illustrates a clamped state of a mold according to another embodiment.
Figure 6:
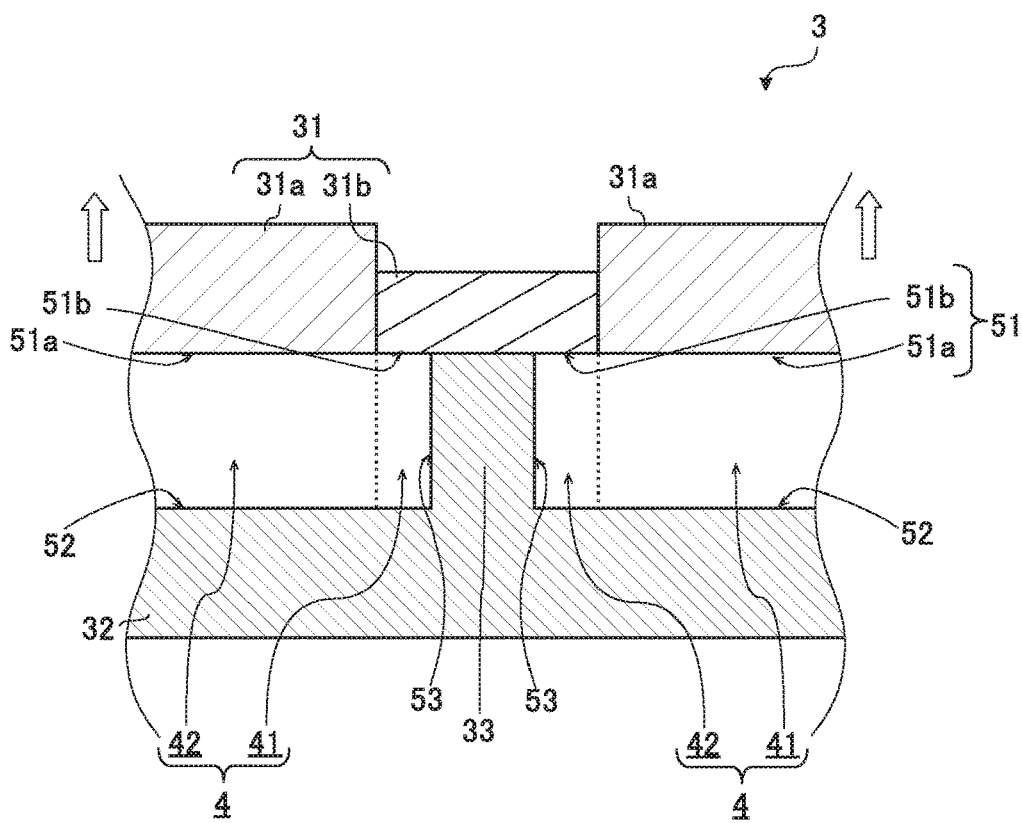
FIG. 6 illustrates a state of the mold after a core-back process according to the other embodiment.
Figure 7:
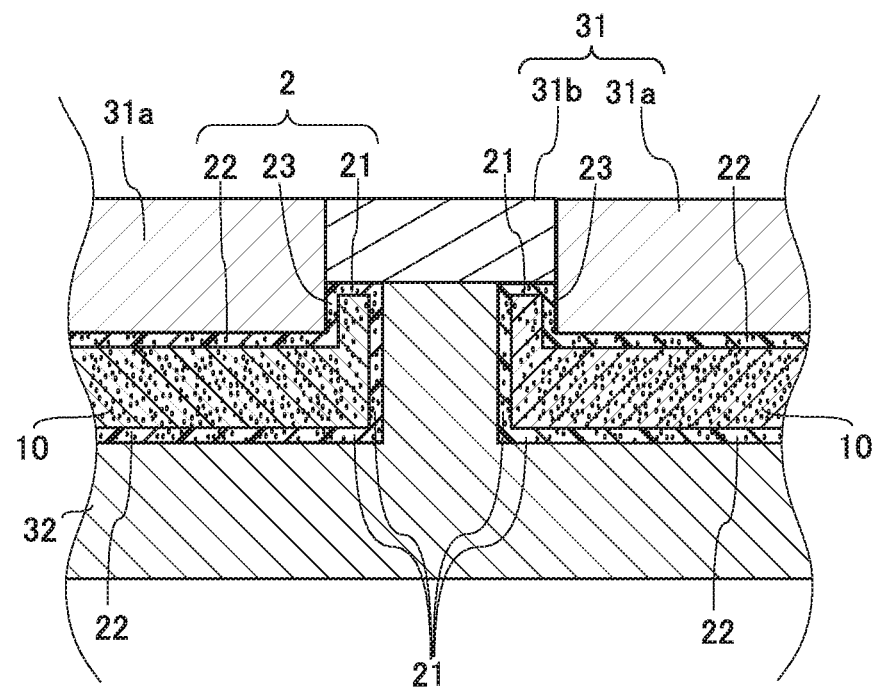
FIG. 7 illustrates a state of the inside of the mole in a filling step of a molding method according to the other embodiment.
Figure 8:
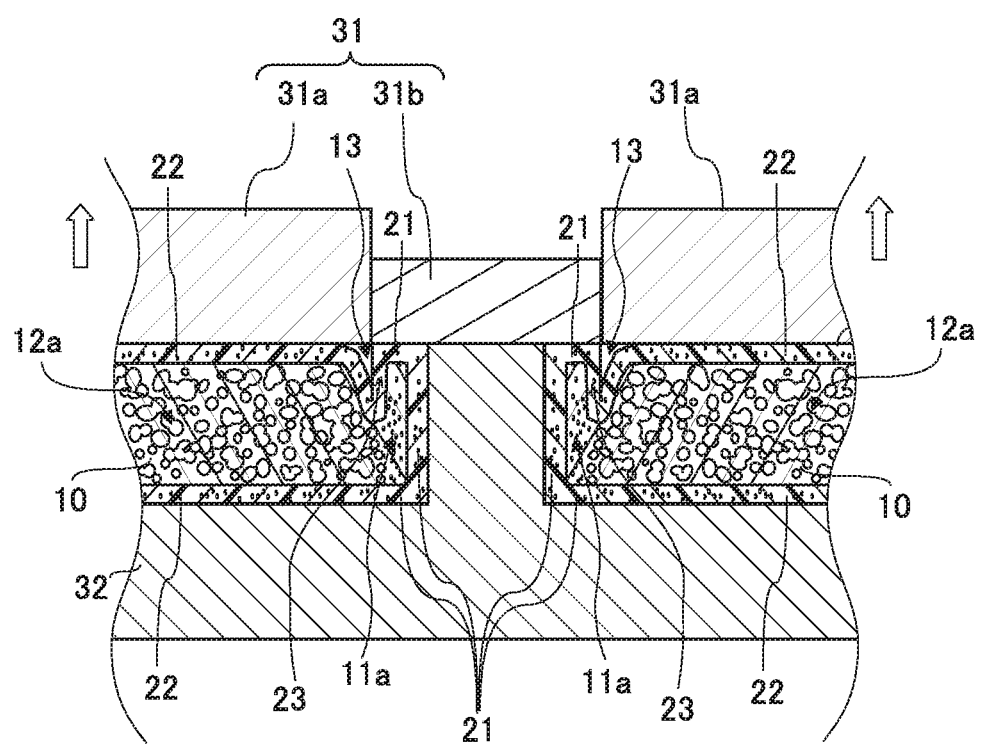
FIG. 8 illustrates a state of the inside of the mold in a core-back step of the molding method according to the other embodiment.

Finally, in the cooling step, the material 10, to be molded, having been filled into the cavity 4 is cooled and solidified. Thus, the foamed resin molded article 1 is molded. As shown in FIG. 5, the foamed resin molded article 1 thus molded by the molding method of the present embodiment has the non-mounting section 12 and the mounting section 11. The non-mounting section 12 has the non-mounting-section skin layer 22 on the surface thereof, and the porous foamed layer 12a in a portion thereof inward of the non-mounting-section skin layer 22. The foamed layer 12a has relatively large pores caused by foaming by the foaming agent. The mounting section 11 has the mounting-section skin layer 21 on the surface thereof, and the fine-foamed layer 11a in a portion thereof inward of the mounting-section skin layer 21. The fine-foamed layer 11a has relatively small pores caused by fine foaming by the foaming agent.

As described above, the foamed layer 12a has a higher foaming ratio of the foaming agent than the fine-foamed layer 11a, and therefore, has a high porosity (void fraction). In other words, the foamed layer 12a is rougher than the fine-foamed layer 11a, and therefore, has a low density. Therefore, the opening peripheral edge section 15 of the mounting section 11 having the fine-foamed layer 11a has a higher mechanical strength than the non-mounting section 12 having the foamed layer 12a.

In the molding method of the present embodiment, in the core-back step, the mounting section 11 is molded while the mounting-section cavity width of the mounting-section cavity portion 41 is made constant. Therefore, the shape of the mounting-section skin layer 21 molded in the filling step is maintained as it is in the filling step without causing shape sag which is likely to occur in the core-back step. Specifically, the mounting hole 14 of the mounting section 11 takes the shape of the protrusion outer peripheral mold surface 53 of the hole molding protrusion 33, and the opening peripheral edge section 15 takes the shape of the mounting-section mold surface 51b of the mounting-section mold portion 31b.

It is known that, in a foamed resin molded article molded using a commonly used core-back molding technique, so-called shape sag occurs at an outer peripheral edge section thereof or the opening peripheral edge section of the mounting hole. This is considered to be caused for the following reason.

If, in the core-back step after the filling step of filling the material to be molded into the cavity, the surface (a portion in contact with the mold surface of the mold) of the material, to be molded, in the cavity has sufficient stretchability, the inner portion of the material to be molded is expanded due to foaming by the foaming agent, and the surface of the material to be molded is pressed against the mold surface of the mold by pressure from the foaming in the inner portion. In other words, the volume of the cavity is increased by the core-back process, which causes reduction of pressure in the cavity, so that the surface of the material to be molded follows the mold surface of the mold that is moved back, and therefore, a foamed resin molded article taking the shape of the cavity obtained after the core-back process is obtained.

However, in fact, when the material to be molded is filled into the cavity, a portion, of the material to be molded, which is in contact with the mold surface of the mold, is cooled, so that a skin layer is formed on the surface of the material to be molded. The skin layer is formed by solidification of the resin material, and therefore, has reduced stretchability. Therefore, the surface of a portion, of the material to be molded, for molding an outer peripheral edge section or the opening peripheral edge section of the mounting hole does not sufficiently follow the mold surface of the mold which is moved back. For such a reason, so-called shape sag having a round portion is formed at an end portion of the molded outer peripheral edge section, the molded opening peripheral edge section, and the like.

Meanwhile, in the core-back step of the present embodiment, the mounting-section cavity width of the mounting-section cavity portion 41 for molding the mounting section 11 is constant, that is, the volume of the mounting-section cavity portion 41 is not increased. In other words, the mounting section 11 including the mounting hole 14 and the opening peripheral edge section 15 of the mounting hole 14 is molded without core-back molding. Therefore, the above problem of shape sag does not arise in the mounting section 11 of the present embodiment. Therefore, the mounting section 11 of the foamed resin molded article 1 which has been molded has the shape of the mounting-section skin layer 21 formed in the filling step without an influence of the core-back step. Thus, according to the molding method of the present embodiment, the mounting section 11 including the mounting hole 14 and the opening peripheral edge section 15 of the mounting hole 14 is molded without an influence of the core-back process, and therefore, the mounting section 11 having excellent dimensional precision is provided in the foamed resin molded article 1.

In addition, as described above, in the foamed resin molded article 1 molded using the molding method of the present embodiment, the non-mounting section 12 molded in the non-mounting-section cavity portion 42 has the non-mounting-section skin layer 22 on the surface thereof, and the foamed layer 12a having foam formed by the foaming agent in a portion thereof inward of the non-mounting-section skin layer 22. Meanwhile, the mounting section 11 molded in the mounting-section cavity portion 41 has the mounting-section skin layer 21 on the surface thereof, and the fine-foamed layer 11a having fine foam formed by the foaming agent in a portion thereof inward of the mounting-section skin layer 21. The fine-foamed layer 11a has a higher density than the foamed layer 12a, and therefore, has a higher load resistance than the foamed layer 12a. In other words, the mounting section 11 including the fine-foamed layer 11a thereinside has a higher load resistance than the non-mounting section 12 including the foamed layer 12a thereinside.

In addition, in the filling step of the present embodiment, as shown in FIG. 1 and FIG. 3, the non-mounting-section mold surface 51a and the mounting-section mold surface 51b are offset from each other, and therefore, the cavity protrusion section 41a protruding from the level of the non-mounting-section cavity portion 42 toward the first mold 31 is formed in the mounting-section cavity portion 41. The cavity protrusion section 41a is defined by the mounting-section mold surface 51b, a portion of the protrusion outer peripheral mold surface 53, and the step mold surface 54. In other words, the area where the material 10, to be molded, which is filled into the cavity protrusion section 41a is in contact with the mold surface of the mold 3 is larger than the area where the material 10, to be molded, which is filled into the non-mounting-section cavity portion 42 is in contact with the mold surface of the mold 3. Therefore, the inner portion of the material 10, to be molded, which is filled into the cavity protrusion section 41a is cooled more effectively than the inner portion of the material 10, to be molded, which is filled into the non-mounting-section cavity portion 42.

Thus, in the filling step of the present embodiment, the solidification by cooling of the material 10, to be molded, which is filled into the mounting-section cavity portion 41 having the cavity protrusion section 41a is accelerated as compared to the material 10, to be molded, which is filled into the non-mounting-section cavity portion 42. In other words, foaming by the foaming agent in the material 10, to be molded, which is filled into the mounting-section cavity portion 41 is considered to be further reduced. Therefore, in the foamed resin molded article 1 after molding, the mounting section 11 molded in the mounting-section cavity portion 41 has the fine-foamed layer 11a in which the foaming by the foaming agent is effectively reduced, and therefore, advantageously has an improved load resistance.

As described above, in the filling step of the present embodiment, the skin layer 2 is formed on a surface, of the material 10 to be molded, which is in contact with the mold surface of the mold 3. As shown in FIG. 1 and FIG. 3, in the filling step, the step skin layer 23 is also formed at the step mold surface 54 of the non-mounting-section mold portion 31a.

In the core-back step after the filling step, the second mold 32 and the mounting-section mold portion 31b are integrally moved back, so that the volume of the non-mounting-section cavity portion 42 is increased. According thereto, the foamed layer 12a which is expanded by foaming by the foaming agent is formed in the material 10, to be molded, which has been filled into the non-mounting-section cavity portion 42. As a result, the non-mounting-section skin layer 22 formed on the surface of the material 10 to be molded is pressed against the non-mounting-section mold surface 51a by foaming pressure. In other words, the surface of the material 10, to be molded, in the non-mounting-section cavity portion 42 follows the non-mounting-section mold surface 51a in the core-back step.

While the second mold 32 and the mounting-section mold portion 31b are moved by the core-back movement, the step skin layer 23 formed in the filling step is pushed by the mounting-section mold portion 31b and drawn by the second mold 32 being moved back. As shown in FIG. 2 and FIG. 4, after the core-back process, the step skin layer 23 is folded over at the boundary between the non-mounting section 12 and the mounting section 11, so that a ring-shaped rib-like reinforcement section 13 extending inward from the surface of the foamed resin molded article 1 is formed. In the reinforcement section 13, the step skin layer 23 in which the foaming agent is solidified in the fine-foamed state is folded over. Therefore, the opening peripheral edge section 15 of the mounting section 11 in which the reinforcement section 13 is formed has a still higher load resistance. Thus, the formation of the ring-shaped rib-like reinforcement section 13 extending inward from the surface of the foamed resin molded article 1 further improves the load resistance of the mounting section 11.

As described above, according to the molding method of the present embodiment and the mold for use in the molding method, in the foamed resin molded article 1 molded by core-back molding, the mounting section 11 is molded with high dimensional precision without the occurrence of shape sag which is likely to occur at the opening peripheral edge section 15 of the mounting section 11. In addition, the load resistance of the opening peripheral edge section 15 of the mounting section 11 against the pressing force of the clip or the like is improved. Furthermore, the foamed resin molded article of the present invention having such a feature exhibits similar effects.

A preferred embodiment of the present invention has been described above. The present invention is not limited to the above embodiment. The advantageous effects of the present invention may be exhibited in the following modification.

For example, as shown in FIG. 5 to FIG. 8, the movable mold and the fixed mold in the mold 3 of the present embodiment, may be reversed. Specifically, in a molding method according to another embodiment, the first mold 31 is movable and the second mold 32 is fixed. In this case, a portion of the movable first mold 31 is prohibited from moving during the core-back process. In the following description, differences in configuration from the above embodiment will be described, and the description of similar parts is not given.

In the mold 3 of another embodiment, as shown in FIG. 5, the first mold 31 includes a mounting-section mold portion 31b which is not moved back during the core-back process, and a non-mounting-section mold portion 31a which is moved back during the core-back process. The mounting-section mold portion 31b and the non-mounting-section mold portion 31a are located adjacent to each other. During the core-back process, the non-mounting-section mold portion 31a is moved back away from the second mold 32, while the mounting-section mold portion 31b is pressed by, for example, a spring in a direction opposite to a core-back direction so that the mounting-section mold portion 31b is fixed so as not to be moved back. Here, in this embodiment, the core-back direction is indicated by an outline arrow shown in FIG. 6 and FIG. 8, that is, means a direction in which the non-mounting-section mold portion 31a of the first mold 31 is away from the second mold 32.

The second mold 32 has a hole molding protrusion 33 for molding the mounting hole 14 of the mounting section 11. The hole molding protrusion 33 is in the shape of a cylinder which protrudes from the second mold 32 toward the first mold 31. The end of the hole molding protrusion 33 is in contact with the mounting-section mold portion 31b. In other words, the second mold 32 and the mounting-section mold portion 31b are configured so as not to be moved during the core-back process.

In the mold 3 of this embodiment, in the core-back step, only the non-mounting-section mold portion 31a of the first mold 31 is moved back. Therefore, as in the core-back step of the above embodiment, the non-mounting-section cavity width of the non-mounting-section cavity portion 42 is increased while the mounting-section cavity width of the mounting-section cavity portion 41 is constant. In other words, the volume of the mounting-section cavity portion 41 is not increased. A molding method according to another embodiment employing such a mold 3 exhibits advantageous effects similar to those of the above embodiment.

Although, in the above embodiments, the hole molding protrusion 33 for forming the mounting hole 14 is provided in the second mold 32, the hole molding protrusion 33 may be provided in the mounting-section mold portion 31b of the first mold 31 instead of being provided in the second mold 32.

Although, in the above embodiments, the mounting hole 14 of the mounting section 11 is a through-hole, the mounting hole 14 of the mounting section 11 may be a recessed portion instead thereof. In this case, according to this embodiment, the hole molding protrusion 33 for forming the mounting hole 14 is preferably configured so that the hole molding protrusion 33 is provided in the mounting-section mold portion 31b of the first mold 31, and the end surface of the hole molding protrusion 33 is not in contact with the second mold surface 52.

Although, in the above embodiments, in the core-back step, the mounting-section mold portion 31b and the second mold 32 are integrally moved until the mounting-section mold surface 51b is substantially flush with the non-mounting-section mold surface 51a, the second mold 32 may not be moved back until the mounting-section mold surface 51b is substantially flush with the non-mounting-section mold surface 51a. Specifically, the mounting-section mold portion 31b may be configured so that the mounting-section mold surface 51b is moved to a position before the non-mounting-section mold surface 51a, or the mounting-section mold surface 51b is moved to a position beyond the non-mounting-section mold surface 51a. In either case, the mounting-section cavity width of the mounting-section cavity portion 41 is constant, and the volume of the mounting-section cavity portion 41 is also constant, and therefore, the mounting section 11 is molded with high dimensional precision while being less affected by the core-back process, and the reinforcement section 13 is also formed.

In the filling steps of the above embodiments, the material 10 to be molded is injected into the cavity 4 of the mold 3, so that the cavity 4 is filled with the material 10 to be molded. However, the filling step of the present invention essentially requires that at least the mounting-section cavity portion 41 is filled with the material 10 to be molded, and the material 10 to be molded may be injected into the non-mounting-section cavity portion 42 without filling the non-mounting-section cavity portion 42 with the material 10 to be molded. In other words, the volume of the non-mounting-section cavity portion 42 is increased by the core-back step, and therefore, the material 10 to be molded may be injected into the non-mounting-section cavity portion 42 in an amount which is sufficient to allow the non-mounting section 12 to have a predetermined thickness after being molded.

In the filling steps of the above embodiments, a portion of the fine-foamed layer 11a is molded in the mounting-section cavity portion 41. However, in the filling step of the present invention, at least the skin layer 2 (the mounting-section skin layer 21 and the step skin layer 23) may be formed in the mounting-section cavity portion 41. Therefore, all the fine-foamed layer 11a that is molded in the mounting-section cavity portion 41 may be molded in the core-back step, or all the fine-foamed layer 11a may be molded in the filling step.

In the filling steps of the above embodiments, the pressure holding is achieved by maintaining the injection pressure. Alternatively, known techniques such as counter pressure and the like may be employed.

The molding methods of the above embodiments and the foamed resin molded article 1 molded by the molds of the above embodiments are applicable to various foamed resin molded articles having the mounting hole 14, for example, are applicable to vehicle interior parts such as a door trim, as well as fixing members such as a bracket which is provided on the back side of an instrument panel of an automobile for holding a register for an air conditioner, a cluster, or the like.

The method and mold for molding a foamed resin molded article according to the present invention, and the foamed resin molded article according to the present invention, are recited as follows.

<1> A method for molding a foamed resin molded article including a mounting section and a non-mounting section other than the mounting section, the mounting section including a mounting hole for mounting the article to a counterpart member and an opening peripheral edge section of the mounting hole, wherein a mold is used, the mold includes a first mold, a second mold, and a cavity, the first mold including a non-mounting-section mold portion having a non-mounting-section mold surface and a mounting-section mold portion adjacent to the non-mounting-section mold portion and having a mounting-section mold surface, the second mold having a second mold surface, and the cavity having a non-mounting-section cavity portion for molding the non-mounting section and a mounting-section cavity portion for molding the mounting section, the non-mounting-section cavity portion being formed between the non-mounting-section mold surface and the second mold surface, the mounting-section cavity portion being formed between the mounting-section mold surface and the second mold surface and being continuous with the non-mounting-section cavity portion, and the cavity having respective cavity widths of the non-mounting-section cavity portion and the mounting-section cavity portion, and the method comprises:

a filling step of filling a resin material (material to be molded) containing a foaming agent into at least the mounting-section cavity portion of the cavity; and a core-back step of moving at least one of the non-mounting-section mold portion, the mounting-section mold portion, and the second mold so that the cavity width of the non-mounting-section cavity portion is increased while the cavity width of the mounting-section cavity portion is constant, the filling step and the core-back step being performed sequentially, and the non-mounting section includes a porous foamed layer and a non-mounting-section skin layer formed on a surface of the foamed layer, and the opening peripheral edge section of the mounting section includes a fine-foamed layer having a density higher than the foamed layer, and a mounting-section skin layer formed on a surface of the fine-foamed layer.

<2> The method, for molding a foamed resin molded article, according to <1>, wherein in the filling step, the non-mounting-section skin layer is molded in the non-mounting-section cavity portion, and the mounting-section skin layer and at least a portion of the fine-foamed layer, of the mounting section, are molded in the mounting-section cavity portion, and in the core-back step, the foamed layer of the non-mounting section is molded in the non-mounting-section cavity portion, and the rest of the mounting section is molded in the mounting-section cavity portion.

<3> The method, for molding a foamed resin molded article, according to <1> or <2>, wherein in the mold in the filling step, the non-mounting-section mold surface is closer to the second mold surface than the mounting-section mold surface is, and the non-mounting-section mold portion has a step mold surface continuous with the non-mounting-section mold surface and intersecting the non-mounting-section mold surface and the mounting-section mold surface, in the filling step, a step skin layer is additionally formed by the step mold surface in the mounting-section cavity portion, and in the core-back step, a reinforcement section is formed, at a boundary between the mounting section and the non-mounting section, by the step skin layer being folded over.

<4> A mold for molding, by core-back molding, a foamed resin molded article including a mounting section and a non-mounting section other than the mounting section, the mounting section including a mounting hole for mounting the article to a counterpart member and an opening peripheral edge section of the mounting hole, the mold comprising:

a first mold including a non-mounting-section mold portion having a non-mounting-section mold surface and a mounting-section mold portion having a mounting-section mold surface; and a second mold having a second mold surface, wherein a cavity formed between the first mold and the second mold has a non-mounting-section cavity portion for molding the non-mounting section and a mounting-section cavity portion for molding the mounting section, the non-mounting-section cavity portion being formed between the non-mounting-section mold surface and the second mold surface, the mounting-section cavity portion being formed between the mounting-section mold surface and the second mold surface, the cavity having respective cavity widths of the non-mounting-section cavity portion and the mounting-section cavity portion, the mounting-section mold portion of the first mold, or the second mold, includes a hole molding protrusion having a protrusion outer peripheral mold surface for molding the mounting hole, the mold has a first state in which the non-mounting-section mold surface is located closer to the second mold surface than the mounting-section mold surface is, and a step mold surface facing the protrusion outer peripheral mold surface, being continuous with the non-mounting-section mold surface, and intersecting the non-mounting-section mold surface and the mounting-section mold surface, defines the mounting-section cavity portion, the mold has a second state in which at least one of the non-mounting-section mold portion, the mounting-section mold portion, and the second mold is moved so that the cavity width of the non-mounting-section cavity portion is increased while the cavity width of the mounting-section cavity portion is constant, and the mold is changed from the first state to the second state.

<5> A foamed resin molded article comprising:

a mounting section including a mounting hole for mounting the article to a counterpart member and an opening peripheral edge section of the mounting hole;

a non-mounting section which is other than the mounting section; and a skin layer provided at a surface of the article, wherein the non-mounting section has a porous foamed layer and a portion (non-mounting section skin layer) of the skin layer formed on a surface of the foamed layer, the mounting section has a fine-foamed layer having a density higher than the foamed layer, and another portion (mounting-section skin layer) of the skin layer formed on a surface of the fine-foamed layer, and the article has a reinforcement section at a boundary between the mounting section and the non-mounting section, the reinforcement section being formed by the rest (step skin layer) of the skin layer being folded over, the reinforcement section extending inward from the surface.

The invention claimed is:

1. A method for molding a foamed resin molded article including a mounting section and a non-mounting section other than the mounting section, the mounting section including a mounting hole for mounting the article to a counterpart member and an opening peripheral edge section of the mounting hole, wherein a mold is used, the mold includes a first mold, a second mold, and a cavity, the first mold including a non-mounting-section mold portion having a non-mounting-section mold surface and a mounting-section mold portion adjacent to the non-mounting-section mold portion and having a mounting-section mold surface, the second mold having a second mold surface, and the cavity having a non-mounting-section cavity portion for molding the non-mounting section and a mounting-section cavity portion for molding the mounting section, the non-mounting-section cavity portion being formed between the non-mounting-section mold surface and the second mold surface, the mounting-section cavity portion being formed between the mounting-section mold surface and the second mold surface and being continuous with the non-mounting-section cavity portion, and the cavity having respective cavity widths of the non-mounting-section cavity portion and the mounting-section cavity portion, and the method comprises:

a filling step of filling a resin material containing a foaming agent into at least the mounting-section cavity portion of the cavity; and a core-back step of moving at least one of the non-mounting-section mold portion, the mounting-section mold portion, and the second mold so that the cavity width of the non-mounting-section cavity portion is increased while the cavity width of the mounting-section cavity portion is constant; before the core-back step, the cavity width of the mounting-section cavity portion being greater than the cavity width of the non-mounting-section cavity portion, and the filling step and the core-back step being performed sequentially, and the non-mounting section includes a porous foamed layer and a non-mounting-section skin layer formed on a surface of the foamed layer, and the opening peripheral edge section of the mounting section includes a fine-foamed layer having a density higher than the foamed layer, and a mounting-section skin layer formed on a surface of the fine-foamed layer.

2. The method, for molding a foamed resin molded article, according to claim 1, wherein in the filling step, the non-mounting-section skin layer is molded in the non-mounting-section cavity portion, and the mounting-section skin layer and at least a portion of the fine-foamed layer, of the mounting section, are molded in the mounting-section cavity portion, and in the core-back step, the foamed layer of the non-mounting section is molded in the non-mounting-section cavity portion, and the rest of the mounting section is molded in the mounting-section cavity portion.

3. The method, for molding a foamed resin molded article, according to claim 1, wherein in the mold in the filling step, the non-mounting-section mold surface is closer to the second mold surface than the mounting-section mold surface is, and the non-mounting-section mold portion has a step mold surface continuous with the non-mounting-section mold surface and intersecting the non-mounting-section mold surface and the mounting-section mold surface, in the filling step, a step skin layer is additionally formed by the step mold surface in the mounting-section cavity portion, and in the core-back step, a reinforcement section is formed, at a boundary between the mounting section and the non-mounting section, by the step skin layer being folded over.

4. The method, for molding a foamed resin molded article, according to claim 2, wherein in the mold in the filling step, the non-mounting-section mold surface is closer to the second mold surface than the mounting-section mold surface is, and the non-mounting-section mold portion has a step mold surface continuous with the non-mounting-section mold surface and intersecting the non-mounting-section mold surface and the mounting-section mold surface, in the filling step, a step skin layer is additionally formed by the step mold surface in the mounting-section cavity portion, and in the core-back step, a reinforcement section is formed, at a boundary between the mounting section and the non-mounting section, by the step skin layer being folded over.

* * * * *